United States Patent
Waltermann et al.

(10) Patent No.: US 10,467,402 B2
(45) Date of Patent: Nov. 5, 2019

(54) SYSTEMS AND METHODS FOR AUTHENTICATION BASED ON ELECTRICAL CHARACTERISTIC INFORMATION

(71) Applicant: Lenovo (Singapore) Pte. Ltd., New Tech Park (SG)

(72) Inventors: Rod D. Waltermann, Rougemont, NC (US); Timothy Winthrop Kingsbury, Cary, NC (US); Justin Tyler Dubs, Raleigh, NC (US); Christopher Aaron Whitesock, Clayton, NC (US); Joseph Michael Pennisi, Apex, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/244,673

(22) Filed: Aug. 23, 2016

(65) Prior Publication Data
US 2018/0060560 A1 Mar. 1, 2018

(51) Int. Cl.
G06F 7/04 (2006.01)
G06F 17/30 (2006.01)
G06F 21/44 (2013.01)
H04L 9/08 (2006.01)
H04L 9/32 (2006.01)

(52) U.S. Cl.
CPC .......... G06F 21/44 (2013.01); H04L 9/0866 (2013.01); H04L 9/3226 (2013.01)

(58) Field of Classification Search
CPC ............................. G06F 21/44; H04L 9/0866
See application file for complete search history.

(56) References Cited

U.S. PATENT DOCUMENTS

| 5,880,677 A * | 3/1999 | Lestician | G01D 4/004 307/17 |
| 8,296,345 B2 * | 10/2012 | Crispin | G06F 7/58 708/250 |
| 8,488,784 B2 * | 7/2013 | Schantz | G06F 21/73 380/270 |
| 9,805,524 B2 * | 10/2017 | Sukumaran | G07C 5/0808 |
| 2003/0072475 A1 * | 4/2003 | Tamori | G06K 9/00013 382/124 |
| 2005/0205804 A1 * | 9/2005 | Chen | G02B 6/0036 250/492.2 |
| 2005/0250473 A1 * | 11/2005 | Brown | H04L 9/3271 455/411 |
| 2007/0036353 A1 * | 2/2007 | Reznik | H04B 7/0434 380/30 |

(Continued)

OTHER PUBLICATIONS

Merete Aardalsbakke, "Human Reliability and Software Development", Norwegian University of Science and Technology, Jun. 2014. Retrieved from www.diva-portal.org/smash/get/diva2:751717/FULLTEXT01.pdf.

*Primary Examiner* — Mahfuzur Rahman
*Assistant Examiner* — Darshan I Dhruv
(74) *Attorney, Agent, or Firm* — John L. Rogitz; John M. Rogitz (57) ABSTRACT

In one aspect, a first device includes a processor and storage accessible to the processor. The storage bears instructions executable by the processor to analyze an electrical characteristic associated with an apparatus and perform one or more actions pertaining to authentication of the apparatus based on the analysis of the electrical characteristic.

23 Claims, 6 Drawing Sheets

(56) References Cited

U.S. PATENT DOCUMENTS

| | | | | |
|---|---|---|---|---|
| 2007/0288663 A1* | 12/2007 | Shear | ............... | H04L 12/66 709/249 |
| 2008/0022398 A1* | 1/2008 | Janke | ............... | G06F 21/445 726/20 |
| 2008/0244257 A1* | 10/2008 | Vaid | ............... | H04L 9/0827 713/2 |
| 2009/0074287 A1* | 3/2009 | Kawashima | ............... | G03F 1/36 382/144 |
| 2009/0083833 A1* | 3/2009 | Ziola | ............... | G06F 21/31 726/2 |
| 2009/0193514 A1* | 7/2009 | Adams | ............... | G06F 21/32 726/17 |
| 2010/0034375 A1* | 2/2010 | Davis | ............... | G06F 21/606 380/42 |
| 2011/0060947 A1* | 3/2011 | Song | ............... | G06F 21/53 714/37 |
| 2011/0093920 A1* | 4/2011 | Etchegoyen | ............... | G06F 21/121 726/3 |
| 2011/0158244 A1* | 6/2011 | Long | ............... | H04L 12/66 370/401 |
| 2012/0162145 A1* | 6/2012 | Knee | ............... | G06K 17/0025 345/179 |
| 2012/0214494 A1* | 8/2012 | Awoniyi | ............... | H04W 88/10 455/439 |
| 2012/0309416 A1* | 12/2012 | Whelan | ............... | G01S 5/0205 455/456.1 |
| 2012/0319724 A1* | 12/2012 | Plusquellic | ............... | H04L 9/0861 326/8 |
| 2013/0083096 A1* | 4/2013 | Rice | ............... | G06F 21/44 347/2 |
| 2013/0179124 A1* | 7/2013 | Patel | ............... | G01R 31/2825 702/190 |
| 2013/0278205 A1* | 10/2013 | Mullins | ............... | G06F 21/44 320/107 |
| 2013/0318607 A1* | 11/2013 | Reed | ............... | G06F 11/3062 726/23 |
| 2014/0009262 A1* | 1/2014 | Robertson | ............... | A61B 5/0006 340/5.52 |
| 2014/0226813 A1* | 8/2014 | Heffner | ............... | H04L 9/0819 380/44 |
| 2014/0259128 A1* | 9/2014 | Fear | ............... | H04L 63/08 726/5 |
| 2015/0154134 A1* | 6/2015 | Beaumont | ............... | G06F 13/36 710/62 |
| 2016/0034010 A1* | 2/2016 | Gettings | ............... | G06F 1/26 713/330 |
| 2016/0036801 A1* | 2/2016 | Caldwell | ............... | H04L 63/08 726/6 |
| 2016/0047855 A1* | 2/2016 | Bhunia | ............... | G01R 31/31858 324/763.01 |
| 2016/0092172 A1* | 3/2016 | Sarpatwari | ............... | G06F 7/58 708/250 |
| 2016/0105435 A1* | 4/2016 | Turner | ............... | H04L 63/107 726/7 |
| 2016/0125180 A1* | 5/2016 | Smith | ............... | H04L 9/0822 726/7 |
| 2016/0142405 A1* | 5/2016 | Deffeyes | ............... | H04L 63/0861 726/7 |
| 2016/0182045 A1* | 6/2016 | Mai | ............... | G09C 1/00 326/8 |
| 2016/0197729 A1* | 7/2016 | Jones | ............... | G06F 12/1408 713/184 |
| 2016/0275290 A1* | 9/2016 | Kotary | ............... | G06F 21/74 |
| 2017/0097700 A1* | 4/2017 | Kim | ............... | G06F 3/044 |
| 2017/0126672 A1* | 5/2017 | Jang | ............... | H04L 63/0428 |
| 2017/0140155 A1* | 5/2017 | Aguayo Gonzalez | .. | G06F 21/55 |
| 2017/0153762 A1* | 6/2017 | Kim | ............... | G06F 3/044 |
| 2017/0339151 A1* | 11/2017 | Van Os | ............... | H04L 67/141 |

\* cited by examiner

SYSTEMS AND METHODS FOR AUTHENTICATION BASED ON ELECTRICAL CHARACTERISTIC INFORMATION

FIELD

The present application relates generally to systems and methods for authentication based on electrical characteristic information.

BACKGROUND

As technology progresses, so do malicious hackers seeking to exploit technological vulnerabilities that secure a given system. As recognized herein, current safeguards are inadequate for addressing the foregoing computer-related problem.

SUMMARY

Accordingly, in one aspect a first device includes a processor and storage accessible to the processor. The storage bears instructions executable by the processor to analyze an electrical characteristic associated with an apparatus and perform one or more actions pertaining to authentication of the apparatus based on the analysis of the electrical characteristic In another aspect, a method includes analyzing an electrical characteristic associated with a device and performing one or more actions pertaining to authentication of the device based on the analyzing of the electrical characteristic.

In still another aspect, a computer readable storage medium (CRSM) that is not a transitory signal comprises instructions executable by a processor of a first device to identify electrical characteristic information pertaining to a second device and use the electrical characteristic information to authenticate the second device.

The details of present principles, both as to their structure and operation, can best be understood in reference to the accompanying drawings, in which like reference numerals refer to like parts, and in which:

DETAILED DESCRIPTION

As recognized herein, computer systems are composed of parts that may be built to specified tolerances. Accordingly, there typically exists an acceptability range for each part's operational characteristics. By combining these parts in a single computer system, a given computer system may wind up with a unique collection of parts owing to each respective part having its own relatively unique operational characteristics still within the respective tolerance for the part. For example, one processor chip may be on the high side of its tolerance, while a resistor may be on the lower side of its tolerance, and accordingly the combination of the two may create a unique micro-electrical current pattern in an electrical path between them when the system when transmitting information.

Further, as also recognized herein, power consumption resulting from execution of predetermined software code may be profiled based on the processor and instructions being executed. Accordingly, the present disclosure recognizes that different computers made of the same parts but manufactured to various levels within the manufacturer's acceptability tolerance may run the same software and generate different micro-electrical current patterns.

Based on the foregoing, the disclosure below provides systems and methods for authenticating a given computer system based on a unique micro-electrical characteristic generated by its unique collection of parts and software code it executes so that the computer system may be profiled. For example, by measuring micro-changes in current draw and/or current draw patterns at one or more points along a current path while executing a known block of code, a unique signature or fingerprint may be identified for a particular computer system and/or collection of computer systems.

Thus, in some examples an ammeter may be connected to one or more points in the current path to measure current along the path.

Additionally or alternatively, an in-line resistor on the computer system's power bus (which may establish such a current path) may be monitored by a voltmeter to measure current and generate a voltage measurement output in proportion to the current. An amplifier on the computer system may then receive the voltage measurement output to enlarge sensed voltage peaks and valleys, and then this enlarged voltage data may be transmitted to an oscilloscope (e.g., on a chip such as a Trusted Platform Module (TPM)-like chip) which may be used to generate unique voltage pattern data (e.g., a time-based, high-speed sampling of various points generating various numbers for the peaks and valleys) to be used in accordance with present principles.

In some examples, the ammeter, voltmeter, and oscilloscope output may be used to diagnose and/or set up/calibrate the system. Accordingly, an analog-to-digital converter (ADC) may be used, where the ADC may receive and convert an analog input (e.g., from the sense resistor, and/or other analog data sources) to a digital signal that a computer processor can read. The ADC may sample the analog signals at very fast rates (e.g., in nanoseconds), and/or the ADC can average an analog signal over a period of time such as 0.1 seconds. The digital output from the ADC may then be provided to the computer system's processor.

The electrical characteristic data received at and/or identified by the computer system's processor may then be used to generate an encryption key, for example. E.g., a chip on the computer system may receive an output from the voltage amplifier, identify an electrical pattern using an ADC in the chip, and use a start and stop sample trigger to select a given portion of the output to use as a key. Thus, in some embodiments, key generation may be limited to a specific period for the pattern that is generated based on the computer system running a particular piece of software code. A reciprocal key may also be generated to establish an asymmetrical key pair and the asymmetrical key pair made then be stored for re-use, with the public key being provided to other devices. Additionally or alternatively, the key pair may be destroyed in the case of a one-time transaction and regenerated again for a subsequent one-time transaction.

Still other ways of generating a key based on an identified electrical characteristic may be used. For example, a management tool using a built in service test (BIST) can monitor various parts of the system. Such a BIST tool may be configured to measure real-time changes in current. Then a key-generation program may request that the BIST tool report collected data and the key-generation program may then transform that into a key for use in accordance with present principles.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g., that is not a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a wireless telephone, notebook computer, and/or other portable computerized device.

Figure 1:
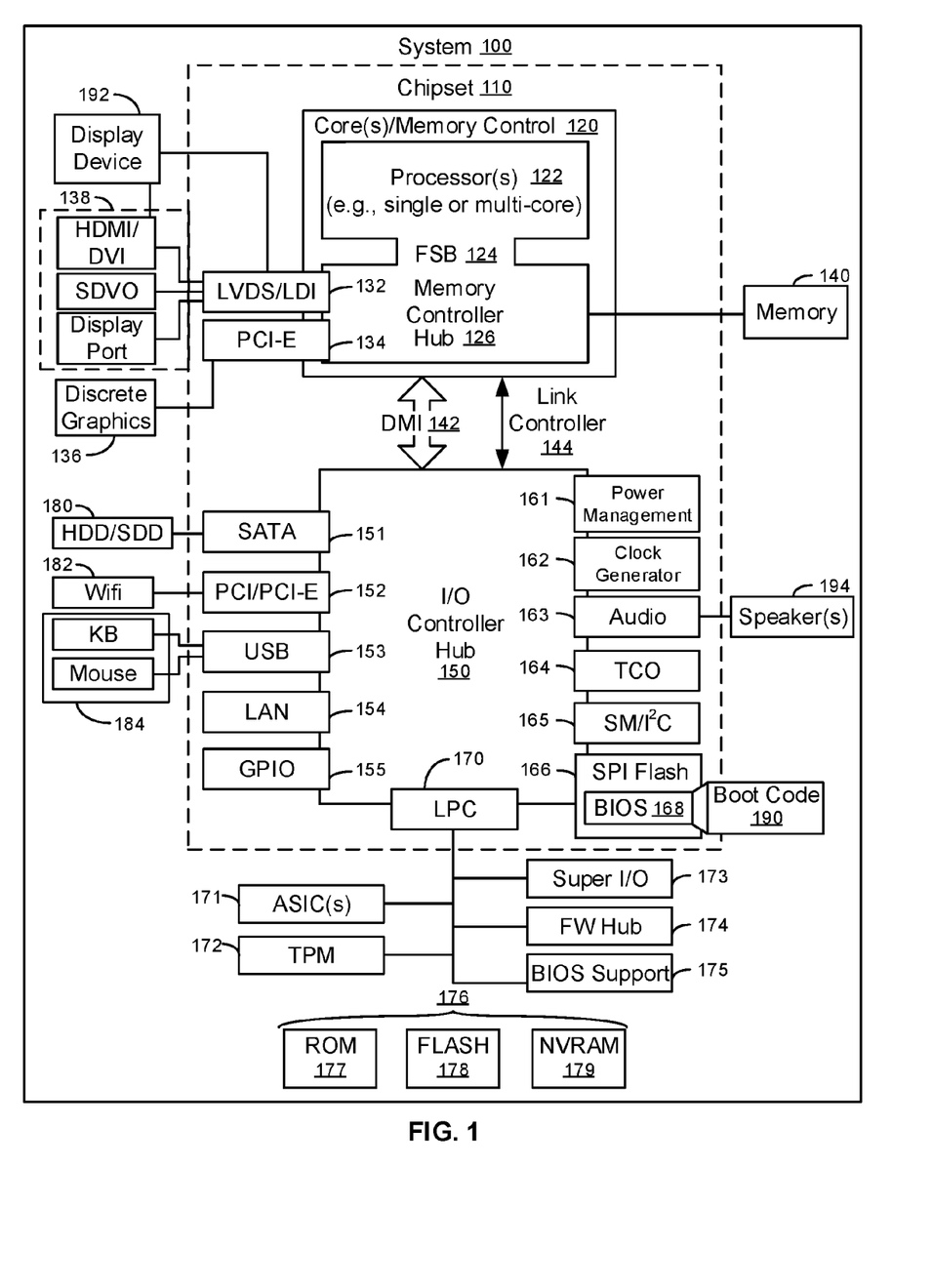
FIG. 1 is a block diagram of an example system in accordance with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, though not shown for clarity, in some embodiments the system 100 may include a gyroscope that senses and/or measures the orientation of the system 100 and provides input related thereto to the processor 122, an accelerometer that senses acceleration and/or movement of the system 100 and provides input related thereto to the processor 122, an audio receiver/microphone that provides input from the microphone to the processor 122 based on audio that is detected, such as via a user providing audible input to the microphone, and a camera that gathers one or more images and provides input related thereto to the processor 122. The camera may be a thermal imaging camera, a digital camera such as a webcam, a three-dimensional (3D) camera, and/or a camera otherwise integrated into the system 100 and controllable by the processor 122 to gather pictures/images and/or video. Still further, and also not shown for clarity, the system 100 may include a GPS transceiver that is configured to receive geographic position information from at least one satellite and provide the information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
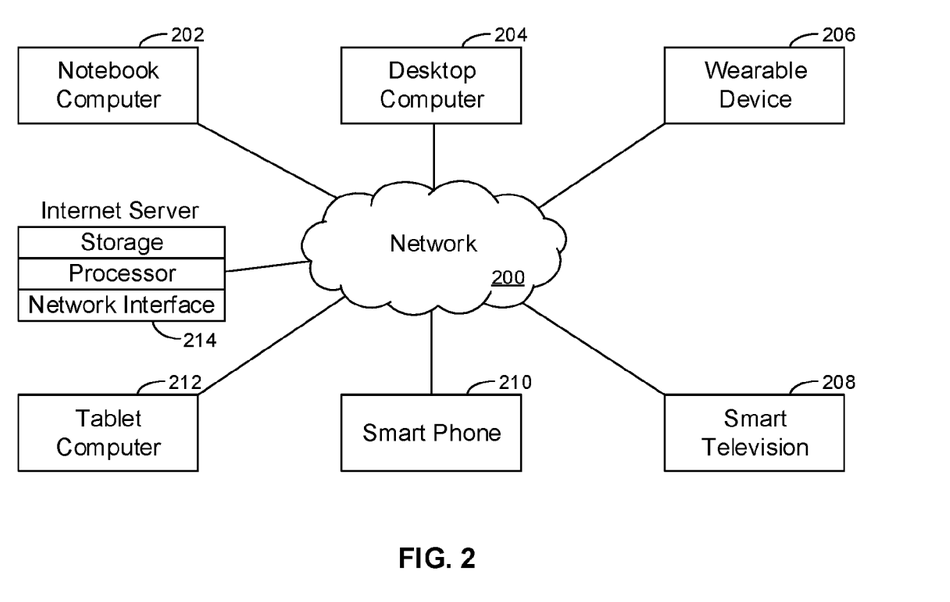
FIG. 2 is an example block diagram of a network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 are configured to communicate with each other over the network 200 to undertake present principles.

Figure 3:
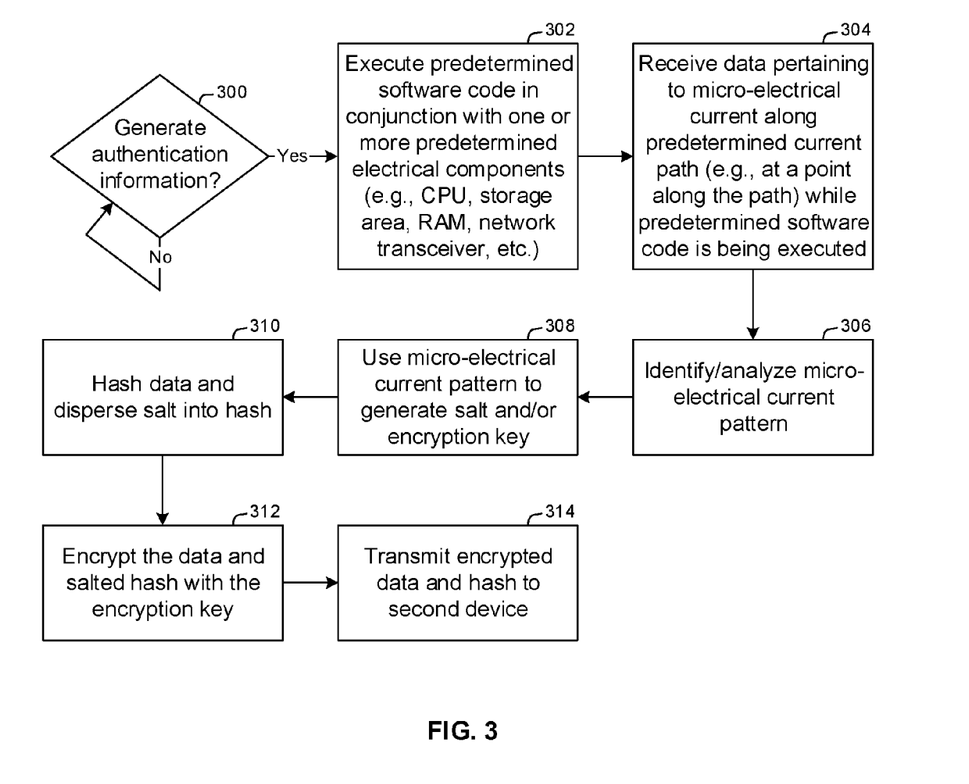
FIGS. 3 and 5 are flow charts of example algorithms in accordance with present principles.

Referring to FIG. 3, it shows example logic that may be executed by a device such as the system 100 (referred to when describing FIG. 3 as the "first device") for using electrical characteristic information it generates (e.g., electrical current information) to establish authentication information for the first device that may then be transmitted to a second device in accordance with present principles. Beginning at decision diamond 300, the logic determines whether it should generate authentication information based on micro-electrical currents the first device generates. A negative determination at diamond 300 may cause the logic to continue to make the same determination at diamond 300, while an affirmative determination at diamond 300 may cause the logic to proceed to block 302. An affirmative determination may be made, for example, responsive to receipt of input from the second device requesting authentication of the first device and/or responsive to a determination that the first device should authenticate itself to the second device.

At block 302 the logic executes predetermined software code, such as a clock application, that may have been specified by an administrator of the system and/or a user. It is to be understood that the software code may be executed in conjunction with one or more predetermined electrical components, such as by using the first device's central processing unit (CPU) to access the predetermined software code as stored in a storage area, load a copy of it into the first device's RAM, and execute the code from the RAM to then generate a message that gets transmitted using a wireless transceiver such as a Wi-Fi transceiver on the first device.

The execution of the code in turn may generate a unique micro-electrical current pattern and/or current pulses of particular magnitudes along a predetermined current path within the first device owing to the unique collection of the electrical components being used by the first device (e.g., the CPU, storage, RAM, and transceiver) owing to those components all being manufactured to within respective acceptability tolerances for the components but still being potentially different from other manufacturer components of the same type as set forth above.

Figure 4:
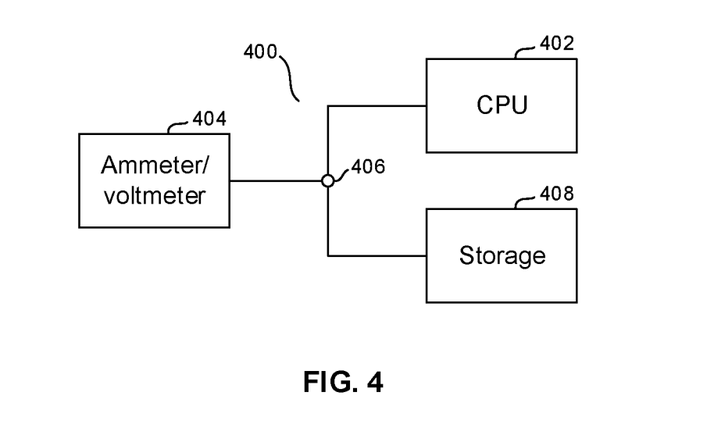
FIGS. 4 and 6 are example illustrations in accordance with present principles.

An example current path 400 is shown in FIG. 4, with the current path being an electrical path between the first device's CPU 402 and storage area 408. An ammeter or voltmeter 404 (in conjunction with an analog-to-digital converter (ADC)) may generate electrical characteristic information such as data pertaining to a micro-electrical current along the path 400 at a predetermined point 406, and then provide the data to the CPU and/or a dedicated chip so that the CPU/chip can perform functions in accordance with present principles.

Accordingly, and referring back to FIG. 3, from block 302 the logic may move to block 304 where the logic may receive such data (e.g., via the ADC) pertaining to the micro-electrical current sensed along a predetermined electrical path while the predetermined software code is executed. Responsive to receipt of the data at block 304, the logic may move to block 306 where the logic may, for instance, identify and/or analyze a micro-electrical current pattern (e.g., the time-based rate at which electrical pulses pass the predetermined point in the electrical path and various (e.g., amplified) magnitudes of the pulses) based on the data received at block 304.

Responsive to identifying the micro-electrical current pattern at block 306, the logic may move to block 308 where the logic may use the identified micro-electrical current pattern to generate a salt and/or encryption key (e.g., PKI key) based on the micro-electrical current pattern as set forth herein.

For example, a salt may be established as a sum of the current draw at each sample point in the current path at which current is sensed. Additionally or alternatively, the salt may be established as the average of the current run, an average magnitude of current peaks or current valleys in particular, and/or a subset of the electrical current data taken at a predetermined time interval.

Regarding the key that is generated, it may be generated as set forth above. Additionally, the key may be generated based on a particular number that is identified, such as the sum of the current draw at each sample point, the average of the current run, the average magnitude of current peaks or current valleys in particular, and/or a subset of the electrical current data taken at a predetermined time interval. This number may be used as the key, for example, based on determining that the number is coprime with the Euler's totient function of N (the modulus).

As another example, the key may be generated by taking a number as described above and inserting it into a predetermined section of a key template. The key template may thus establish an incomplete key that becomes a complete key based on insertion of the number into the predetermined section.

From block 308 the logic may then move to block 310. At block 310 the logic may hash a piece of data (e.g., a file, a digital certificate, etc.) and disperse the generated salt into the hash.

From block 310 the logic may proceed to block 312. At block 312 the logic may use the generated key to encrypt the piece of data and the salted hash. Then at block 314 the logic may transmit the encrypted data and encrypted salted hash to the second device (that may together establish authentication information for use by the second device), where both the data and salted hash may be decrypted using a reciprocal key (e.g., public key) made available to the second device.

Thus, it is to be understood that the second device may already have access to a copy of the salt as already stored at a secure location in the second device (e.g., during an initial setup for authenticating the first device) and/or may already have access to the reciprocal key. The second device may thus access the copy of the salt, subtract the salt from the decrypted hash, hash the decrypted piece of data using the same process that the first device used to hash it (using a predetermined, agreed-upon algorithm), and compare the hash of the decrypted piece of data to the decrypted hash (minus the salt) received from the first device. If the second device determines that the two hashes match (e.g., only after subtracting the salt from the received hash) and/or that the encrypted piece of data and salted hash are able to be decrypted using the reciprocal public key, this may be used to authenticate that the piece of data actually came from the first device and not from another source. Additionally or alternatively, it may to authenticate that the piece of data has not been altered during transmission to the second device.

Before moving on to the description of other figures, it is to be understood in reference to FIG. 3 that in some embodiments the first device may not store the generated key and/or salt in non-transitory storage accessible to it, but instead generate one or both of them based on identification of a micro-electrical characteristic as set forth herein each time authentication is to be performed. Thus, even though the reciprocal public key may be made available, unauthorized access to the private key and/or salt at the first device will not be possible since the key and/or salt have not been stored thereat.

Figure 5:
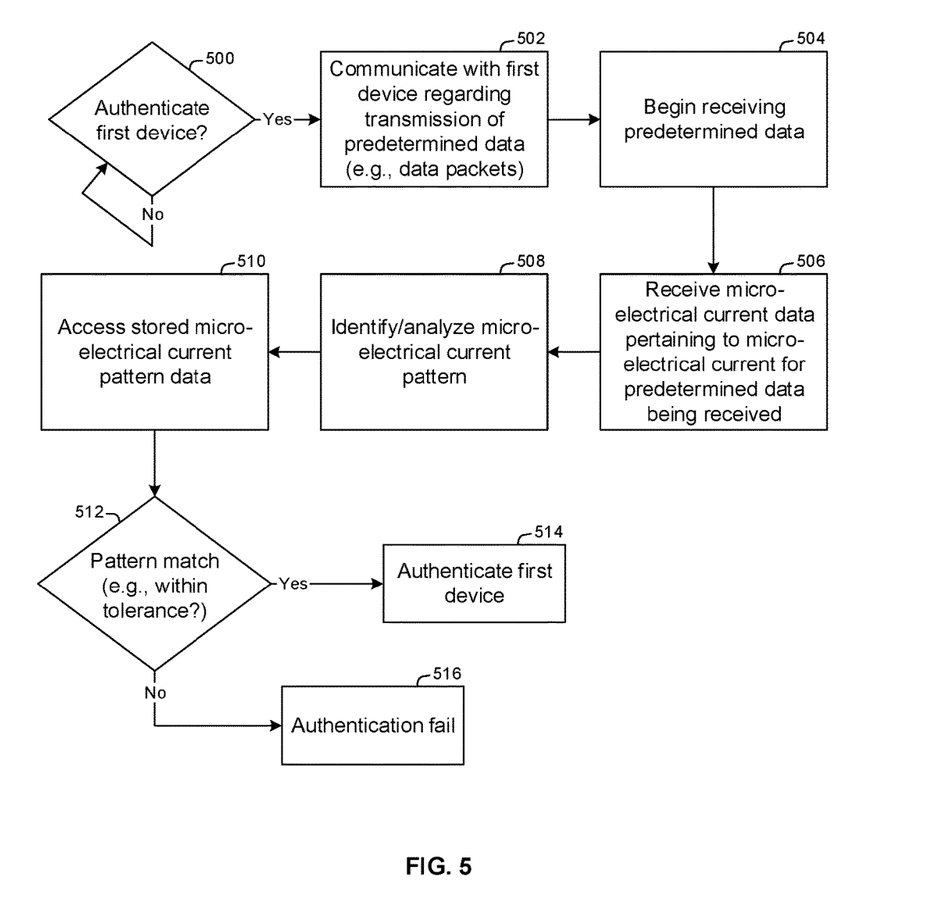

Now referring to FIG. 5, it shows example logic that may be executed by a device such as the system 100 (referred to when describing FIG. 5 as the "second device") for identifying electrical characteristic information generated by a first device to authenticate the first device in accordance with present principles. In this example, the electrical characteristic information may pertain to a rate (e.g., in nanoseconds or even sub-nanoseconds) and/or power line frequency at which data is received from a first device as determined based on one or more sensed electrical characteristics as data is received at the second device.

Beginning at decision diamond 500, the logic may determine whether the second device is to authenticate the first device. A negative determination at diamond 500 may cause the logic to continue to make the same determination at diamond 500, while an affirmative determination at diamond 500 may cause the logic to proceed to block 502. An affirmative determination may be made at diamond 500, for example, responsive to receipt of data purporting to be from the first device, responsive to a determination that the first and second device are to securely exchange information, etc.

At block 502 the logic may thus communicate with the first device regarding the transmission of predetermined data, such as transmission of predetermined data packets in a predetermined sequence. Thus, at block 502, for example, the second device may transmit an indication to the first device that it should begin transmitting such packets. From block 502 the logic may move to block 504. At block 504 the logic may begin receiving the predetermined data (e.g., via a network transceiver on the second device) and then move to block 506.

At block 506 the logic may receive data pertaining to a micro-electrical current sensed by and/or coming into the second device as the packets are received. For example, the logic may receive the data from an ammeter or voltmeter on the second device (e.g., via an ADC), and/or from the network transceiver through which the data is being received and that senses the timing pattern of the packets as they are received. Power line frequency information may also be received from a sensor on the second device that senses the frequency as the packets are received.

Responsive to receipt of the data at block 506, the logic may move to block 508 where the logic may analyze the data received at block 506 to identify electrical characteristic information, such as a micro-electrical timing pattern at which packets are received, and/or the electrical frequency at which the packets are received (such as using a Fourier transform).

Responsive to identification of the electrical characteristic information (e.g., the current pattern) at block 508 based on the data received at block 506, the logic may move to block 510. At block 510 the logic may access a stored reference current pattern, for instance, such as may be stored in a secure location on the second device.

From block 510 the logic may move to block 512 where the logic may compare the pattern identified at block 508 to the reference pattern accessed at block 510 to determine whether they match (e.g., at least within a predefined tolerance) and hence whether the predetermined data packets are being received in a pattern consistent with transmission from the first device (when also, for example, accounting for ping time along an expected traceroute) or whether they are being received in a different pattern. Responsive to an affirmative determination at 512, the logic may move to block 514 where the logic may authenticate the first device. However, responsive to a negative determination at diamond 512, the logic may instead move to block 516 where the logic may fail/decline to authenticate the first device and may take other appropriate action, such as discarding the data being received.

Thus, it may be appreciated based on the foregoing description of FIG. 5 that timing characteristics such as ping time combined with an expected traceroute may be used to build a spanning tree between the first and second devices. Variations in network traffic patterns may thus be leveraged to help to determine that a device representing itself as the first device is in fact the first device based on the timing that predetermined packets are received at the second device.

For example, since ping time and traceroute may be known, that information may be merged with the micro-current pattern expected from the first device so that when the second device is performing a current pattern computation it may compensate for the known network traffic ping time (based on an expected traceroute) to determine whether predetermined packets are in fact being received from the first device and not another device (e.g., at another location that would thus result in a different ping time even if fraudulently purporting to be the first device and transmitting the predetermined packets).

Moreover, in some embodiments both the first device and the second device may concurrently execute the same processes—authenticating the other device and providing authentication information to the other device—and in such a case both devices may measure the change in current as they receive the known packets and process them. This can then be correlated by each device with the expected timing of the traffic arrival, such that the receiving device may determine, for validly authenticating the sending device, that the micro-electric current timing for packets from the sending device and the expected current pattern should be equal given the network traversal time.

For example, suppose there are two servers that wish to exchange secure information. Both servers would run a specific algorithm (e.g., beginning at a specific, designated time for both) that included measuring not only their local micro-current patterns, but also identifying network timing information between the two servers. The network traffic may alter the micro-current timing to each system, and so when an expected micro-current pattern of incoming data packets is altered based on current network timing patterns to generate a new expected micro-current pattern, one server receiving the predetermined packets at the new expected micro-current pattern may lead to that server authenticating the other one based on the new expected micro-current pattern to ensure that not only were the two systems measuring their own current, but that they were doing it while communicating with each other where the current skew for network should match up with the network travel time delays that are expected.

Figure 6:
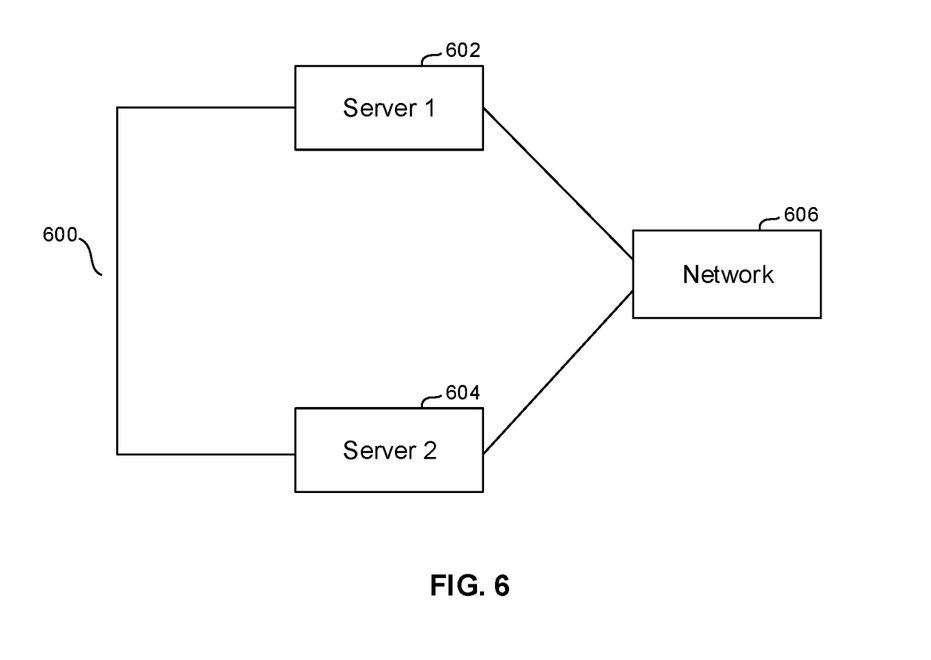

As another example, and as shown in FIG. 6, a dedicated out-of-band (OOB) connection 600 (such as an OOB cable) between two or more servers 602, 604 in the same rack and/or server room may be leveraged (instead of using a wide-area network 606) to provide a clear and consistent means to communicate and/or measure the communication interaction, thus ensuring a relatively tighter tolerance on the measurement of the expected current pattern/power line frequency.

Additionally, in some embodiments the current pattern/power line frequency along the OOB connection 600 itself may be monitored to identify a particular pattern/frequency at which data is being transmitted through the OOB connection 600 to perform an authentication of one of the servers 602, 604 by the other of the servers 602, 604 in accordance with present principles. Such data may also be used to authenticate that data is specifically being received through the OOB connection 600 itself rather than another communication means.

Figure 7:
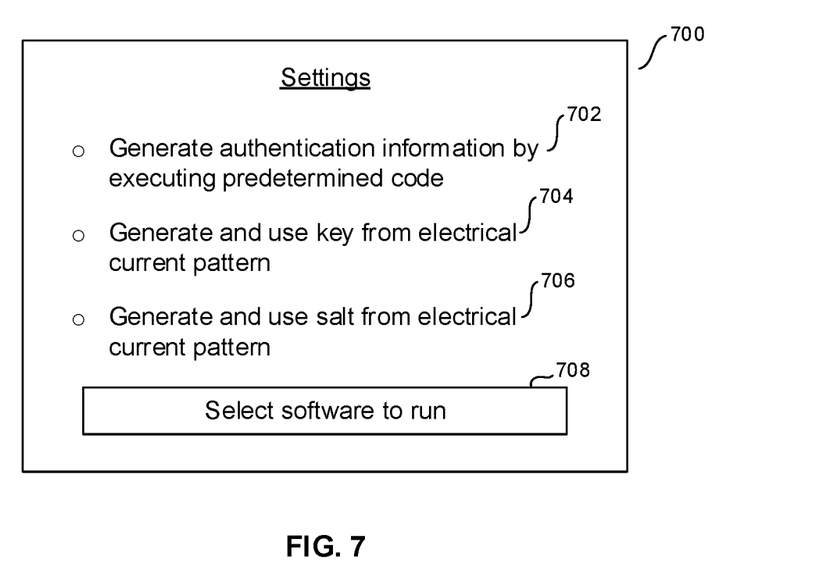
FIGS. 7 and 8 are example user interfaces (UIs) in accordance with present principles.

Now describing FIG. 7, it shows an example user interface (UI) 700 presentable on a device such as the first device referenced above when describing FIG. 3 for configuring settings of that device. The UI 700 includes a first option 702 selectable using the radio button shown adjacent to it to enable generation of authentication information by executing predetermined software code (e.g., so that the device may be authenticated at another device based on the timing of arrival of predetermined data packets).

The UI 700 may also include a second option 704 selectable using the radio button shown adjacent to it to enable generation and use of an encryption key based on electrical characteristic information in accordance with present principles. Still further, the UI 700 may include a third option 704 selectable using the radio button shown adjacent to it to enable generation and use of a salt based on electrical characteristic information in accordance with present principles. The UI 700 may further include a selector 708 that is selectable to cause another UI to be presented from which a piece of software may be selected as the software to run for authentication using electrical characteristic information as set forth herein.

Figure 8:
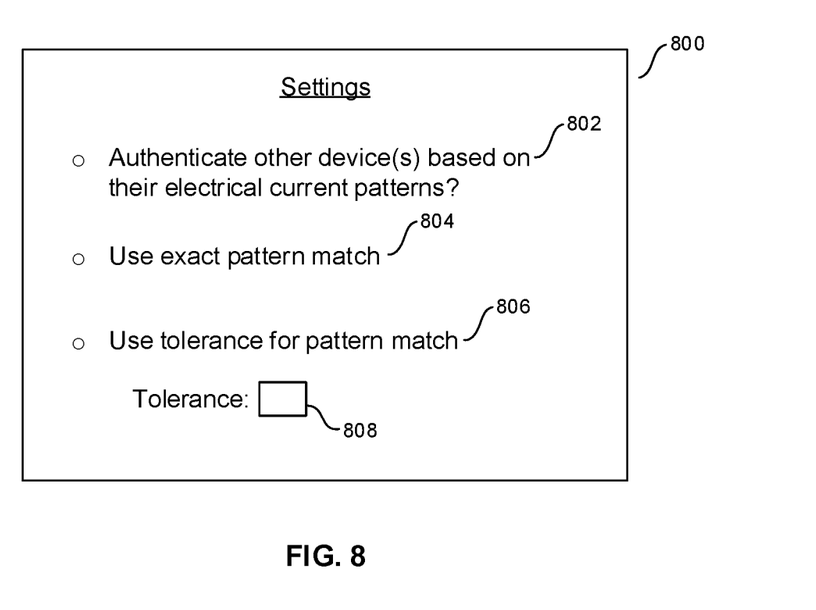

FIG. 8 shows an example user interface (UI) 800 presentable on a device such as the second device referenced above when describing FIG. 5 for configuring settings of that device. The UI 800 includes a first option 802 selectable using the radio button shown adjacent to it to authenticate other devices based on the timing of predetermined packets that are received from them in accordance with present principles. The UI 800 may also include a second option 804 selectable using the radio button shown adjacent to it to configure the device to require an exact match for a detected timing pattern when compared to an expected timing pattern. A third option 806 may further be included on the UI 800 that is selectable using the radio button shown adjacent to it to configure the device to use a timing match within a tolerance (rather than an exact match). A tolerance may be specified by a user by providing input to input box 808.

Before concluding, it is to be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory signal and/or a signal per se.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:
   at least one processor; and
   storage that is not a transitory signal, that is accessible to the at least one processor, and that comprises instructions executable by the at least one processor to:
   present a user interface (UI) on a display, the UI comprising an option that is selectable to set the first device to perform one or more actions pertaining to authentication of an apparatus based on identification of one or more electrical characteristics associated with the apparatus;
   based on selection of the option, identify a first electrical characteristic associated with the apparatus that is unique to the apparatus; and
   perform the one or more actions pertaining to authentication of the apparatus based on the identification of the unique first electrical characteristic;
   wherein the apparatus is the first device, and wherein the unique first electrical characteristic is identified based on the first device executing predetermined software code in conjunction with a predetermined electrical component on the first device.

2. The first device of claim 1, wherein the unique first electrical characteristic pertains to one or more of: a rate, a frequency at which data packets are received from the apparatus.

3. The first device of claim 1, wherein the predetermined electrical component is selected from the group consisting of: a predetermined storage area, a predetermined random access memory (RAM), a predetermined network transceiver.

4. The first device of claim 1, wherein the first device comprises one or more of an ammeter and a voltmeter, and wherein the unique first electrical characteristic is identified based on input from the one or more of ammeter and voltmeter.

5. The first device of claim 1 wherein the instructions are executable by the at least one processor to:
   use the unique first electrical characteristic as part of authentication information for the first device and transmit the authentication information to a second device.

6. The first device of claim 5, wherein the unique first electrical characteristic is used as a salt for generating the authentication information.

7. The first device of claim 5, wherein the unique first electrical characteristic is used to generate a key associated with the authentication information.

8. The first device of claim 1, wherein the unique first electrical characteristic pertains to one or more of a unique micro-pattern and a unique nano-pattern generated by the apparatus.

9. The first device of claim 8, wherein the one or more of the unique micro-pattern and the unique nano-pattern comprises a unique frequency characteristic.

10. A method, comprising:
    presenting a user interface (UI) on a display, the UI comprising an option that is selectable to enable a setting for an apparatus to perform one or more actions pertaining to authentication of a device based on analysis of one or more electrical characteristics associated with the device;
    based on the setting being enabled, analyzing a first electrical characteristic associated with and unique to the device at least in part by analyzing a unique electrical pattern with which predetermined packets are received from the device; and
    performing the one or more actions pertaining to authentication of the device based on the uniqueness of the first electrical characteristic.

11. The method of claim 10, wherein the one or more actions pertaining to authentication of the device comprise authenticating the device based on the unique electrical pattern with which the predetermined packets are received from the device.

12. The method of claim 10, comprising:
    executing predetermined code at the device and analyzing the uniqueness of the first electrical characteristic at a predetermined point in an electrical path.

13. The method of claim 10, comprising:
    executing predetermined code at the device and analyzing the uniqueness of the first electrical characteristic along an electrical path.

14. The method of claim 13, wherein the one or more actions pertaining to authentication of the device comprise generating a key based on a unique electrical pattern sensed along the electrical path.

15. The method of claim 14, wherein the one or more actions pertaining to authentication of the device comprise encrypting data with the key and transmitting the encrypted data to an authentication device.

16. The method of claim 13, wherein the one or more actions pertaining to authentication of the device comprise generating a salt based on a unique electrical pattern sensed along the electrical path.

17. The method of claim 16, wherein the one or more actions pertaining to authentication of the device comprise altering data with the salt, hashing the altered data, and transmitting a hash of the altered data to the device.

18. An apparatus, comprising:
at least one computer readable storage medium (CRSM) that is not a transitory signal, the at least one computer readable storage medium comprising instructions executable by at least one processor of a first device to:
present a user interface (UI) on a display, the UI comprising an option that is selectable to enable a setting for the first device to authenticate a second device based on identification of electrical characteristic information pertaining to the second device;
based on the setting being enabled, identify unique first electrical characteristic information pertaining to the second device at least in part by identifying a unique first micro-pattern pertaining to data received by the second device; and
use the uniqueness of the first electrical characteristic information to authenticate the second device at least in part by using the unique first micro-pattern to authenticate the second device based on the first micro-pattern matching an expected micro-pattern at least within a tolerance.

19. The first device of claim 1, comprising the display.

20. The apparatus of claim 18, comprising the display.

21. The apparatus of claim 18, comprising the at least one processor.

22. The apparatus of claim 21, comprising a network transceiver through which the data is receivable.

23. The apparatus of claim 18, wherein the tolerance accounts for ping time along an expected traceroute.

* * * * *